B. PHELPS.
COMBINATION PLOW AND DRILL.
APPLICATION FILED APR. 30, 1914.

1,113,906.

Patented Oct. 13, 1914.
2 SHEETS—SHEET 1.

Witnesses
Fenton S. Belt
A. L. Hough

Inventor
B. Phelps
By Franklin N. Hough
Attorney

B. PHELPS.
COMBINATION PLOW AND DRILL.
APPLICATION FILED APR. 30, 1914.

1,113,906.

Patented Oct. 13, 1914.
2 SHEETS—SHEET 2.

Witnesses
Fenton H. Belt
A. L. Hough

Inventor
B. Phelps
By Franklin N. Hough
Attorney

UNITED STATES PATENT OFFICE.

BONNIE PHELPS, OF OKLAHOMA, OKLAHOMA.

COMBINATION PLOW AND DRILL.

1,113,906.      Specification of Letters Patent.      Patented Oct. 13, 1914.

Application filed April 30, 1914. Serial No. 835,502.

*To all whom it may concern:*

Be it known that I, BONNIE PHELPS, a citizen of the United States, residing at Oklahoma city, in the county of Oklahoma and State of Oklahoma, have invented certain new and useful Improvements in Combination Plows and Drills; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combination plows and drills, the object being to produce a drill which is attached to the plow beam in which the plow may be adapted to be tilted without interfering with the drill which remains upon a level plane.

The invention comprises various details of construction, combinations and arrangements of parts which will be hereinafter fully described, shown in the accompanying drawings and then specifically defined in the appended claim.

Figure 1:
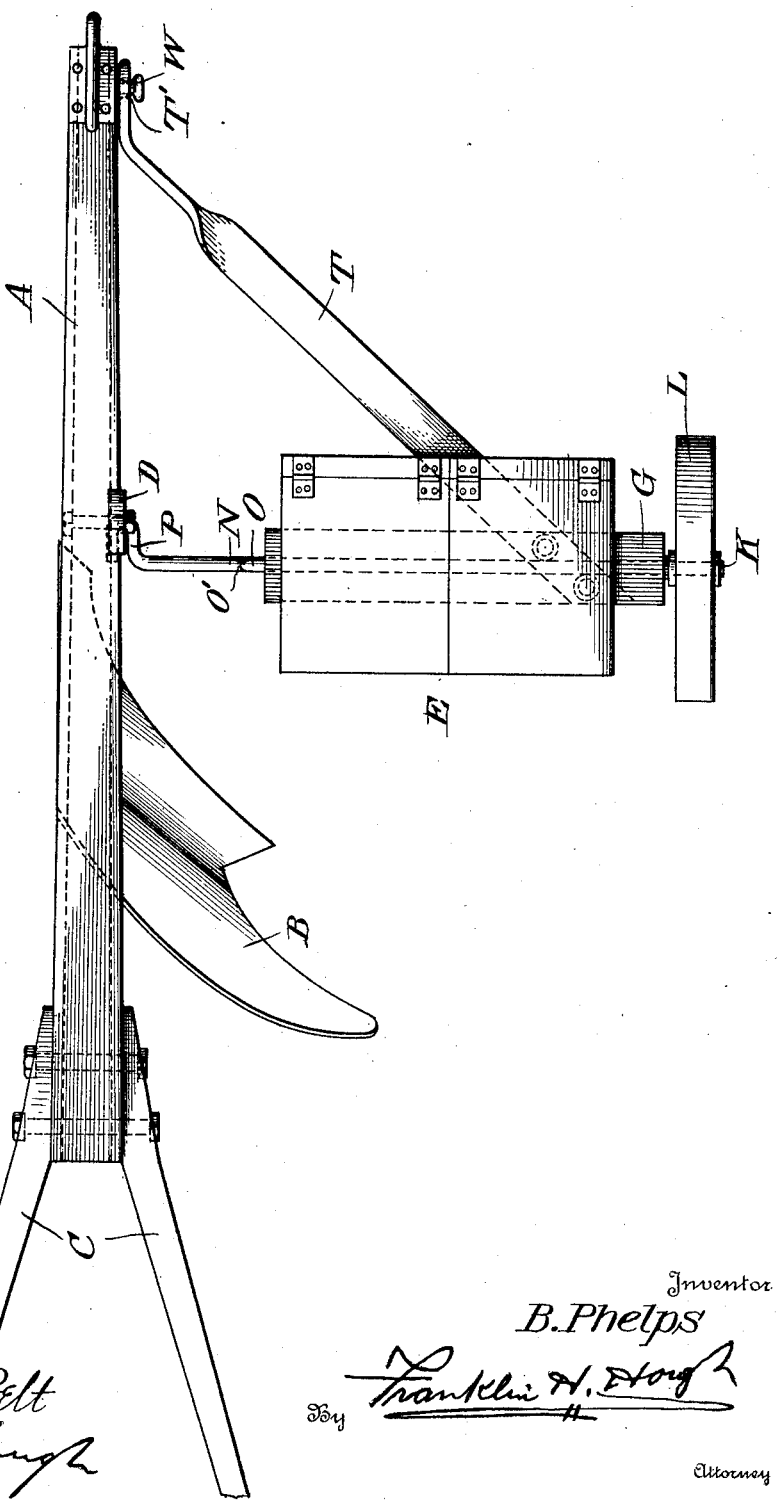
Figure 2:
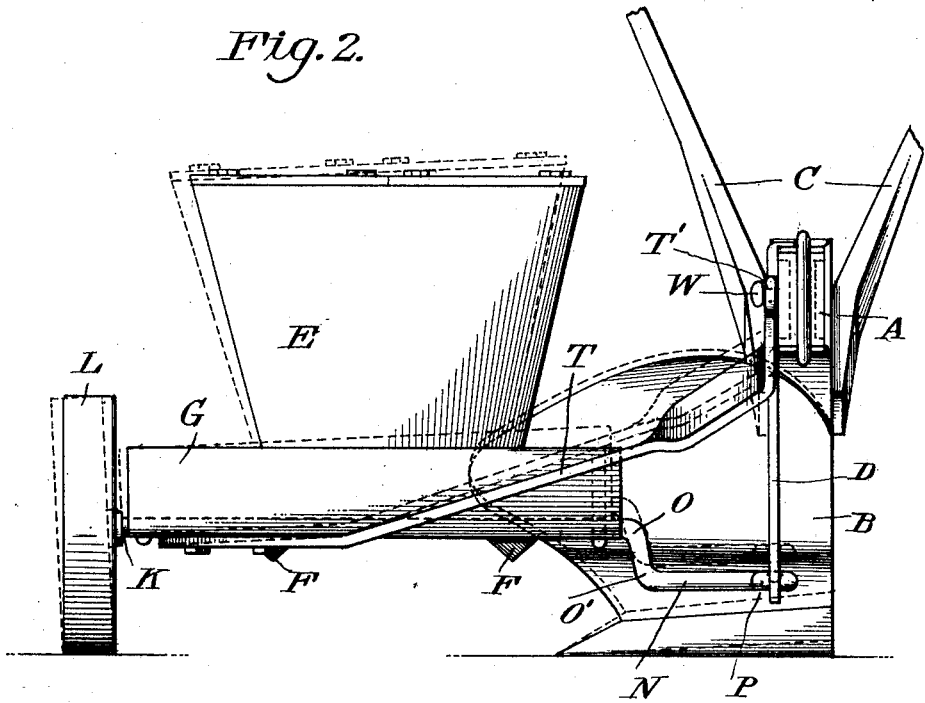
Figure 3:
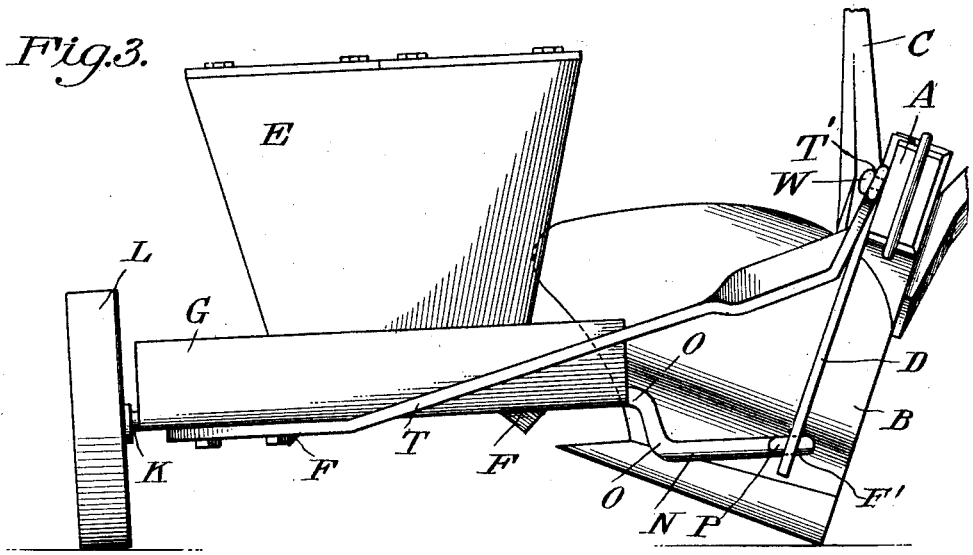

My invention is illustrated in the accompanying drawings, in which:

Figure 1 is a top plan view of a drill made in accordance with my invention. Fig. 2 is an end view showing the plow tilted upward while the drill remains in a diametrically horizontal position, and Fig. 3 is a similar view showing the connection between the drill and the beam of the plow.

Reference now being had to the details of the drawings by letter, A designates a plow beam, B the plow secured to the beam and C are the handles. A bar D is fastened to the plow beam and has an aperture F' near its lower end.

E designates a seed hopper having cups in the bottom thereof which lead to the spouts F, said hopper being mounted upon the frame G at one end of which is a spindle axle K upon which the wheel L is mounted. A rod, designated by letter N, is fastened to the under surface of said frame and is bent at right angles at two points, designated by letters O and O', and its free end is bent to form a hook P adapted to have a pivotal connection with the aperture in the bar D. Fastened to said frame upon which the hopper is mounted is a bar T and its forward end is apertured as at T' for the reception of the pin W which is fastened near the forward end of the beam.

In operation, it will be noted that, when is is desired to turn the plow beam for any purpose, it may be done without interfering with the seed hopper, the latter being held in a horizontal position, even though the plow and beam turn either to the right or left, or raised or lowered, the brace and the pivotal connection between the frame and beam permitting of such movement.

What I claim to be new is:

In combination with a plow beam, a seed hopper, a frame upon which the same is mounted, a shaft fastened to the frame, one end of which forms a spindle, a wheel journaled upon the spindle, the other end of the shaft bent at right angles at two locations and having a portion which extends beyond the end of the frame and which terminates in a hook, a rod fastened to the beam and having an aperture in its end engaged by said hook, a bar fastened at one end to the frame and in diagonal relation to the said hopper, its other end bent at an angle and apertured, a headed pin upon said beam and with which the angled end of the bar has a loose pivotal connection.

In testimony whereof I hereunto affix my signature in presence of two witnesses.

BONNIE PHELPS.

Witnesses:
     WM. JOHNSON,
     A. C. JOHNSON.

---

Copies of this patent may be obtained for five cents each, by addressing the "Commissioner of Patents, Washington, D. C."